Patented Dec. 7, 1926.

1,609,367

UNITED STATES PATENT OFFICE.

CARL KULAS AND CURT PAULING, OF LEIPZIG-LINDENAU, GERMANY, ASSIGNORS TO SAID KULAS, OF LEIPZIG, GERMANY.

PROCESS FOR MAKING PHENOL RESINS AND PRODUCT THEREOF.

No Drawing. Application filed August 30, 1923, Serial No. 660,253, and in Germany October 12, 1922.

This invention relates to a process for the manufacture of resits or final condensation products from phenol and formaldehyde.

In the manufacture of those final condensation products or resits (see Lebach, Zeitschrift für angewandte Chemie 1909, page 1601) many chemical processes take place in the course of which considerable quantities of volatile products, especially phenol, water and formaldehyde are liberated. The reactions leading to the production of final products or resits require the application of heat. Such application is only possible from the outside and causes owing to the bad conductivity of all phenol resins that the outside portions of the articles to be hardened are in a more advanced state of conversion than the inner portions. It is well known that there are intermediate products before the final or resit state is reached. The initial condensation product from the reaction between phenol and formaldehyde is termed according to Lebach, "resol"; by further heating the resol is converted into "resitol." While "resol" and "resitol" are permeable for the vapors of phenol and the like, such is not the case with the resit itself. As soon as the article to be hardened, has, owing to the heat applied from the outside, attained even a very thin coating of resit, the vapors of the products liberated in the interior of the article can no longer penetrate the outer skin, whereby internal stresses or fissures and in consequence thereof blisters or swollen places are produced.

Various means have been proposed to overcome this very objectionable disadvantage. According to one proposal heat and pressure are applied simultaneously. In this manner the external shape of the article to be hardened is maintained. However, electrical properties of the article are considerably impaired, inasmuch as the vapors of the liberated volatile products being from the very beginning prevented from escaping are obliged to remain in the finished article, where they are either combined in solid solution with the resin body or are localized in the form of miscroscopically minute bubbles, which naturally cause a deterioration of the dielectric properties of the article. Such pieces may be quite useful for normal cases. As soon as, however, the voltage applied exceeds a certain value slowly destructive influences arise, which find their outlet at the dielectrically disturbed places, and finally destroy the piece after a longer or shorter time.

A further disadvantage of the hardening by the simultaneous application of heat and pressure is the fact, that owing to the intimate contact of the outer resin portions with the hot walls of the mould the production of resit or final condensation product from the outside sets in very soon and is accompanied by a shrinkage. The result is the generation of internal stresses, which may be observed in articles, prematurely removed from the moulds by a subsequent inflation or swelling. These stresses remain, however, even then, if by a sufficiently long continued action of pressure and heat the layer of resit or final condensation product has become so thick, that it is able to resist a subsequent deformation. Such articles show frequently cracks or fissures later on.

It has therefore been proposed to produce articles and in particular large articles in such a manner, that the process is not started from the resol or initial condensation product, but from the resitol or intermediate condensation product, the plastic properties of which in the hot state allow hot pressing. Not taking into consideration that this process is complicated, it fails when filled articles are to be produced in so far as the necessary homogeneousness can only be obtained with difficulty.

It has furthermore been attempted to attain the required homogeneousness and abscence of internal stresses by the addition of plasticizing agents. As such have been proposed: alcohol, glycerine, camphor, phenol, naphthaline, chloride of naphthaline, anthracene, resin, caoutchouc, celluloid, and others. The results attained varied considerably. It must be admitted, that all these substances have a favorable action in so far as they retard the hardening considerably, so that the heat may penetrate better into the interior of the article and there bring about the conversions desired. Yet the danger exists that bubbles are formed, which has been particularly observed in the case of easily volatile plastificating agents, such as alcohol. These bubbles can only be prevented by keeping the hardening temperature very low, whereby on the one hand the entire hardening process is unduly lengthened and on the other hand the desirable and necessary maximum of hardness and chemical resistance is not attained either. Many of these plasticizing agents furthermore impair the electrical properties of the material in a considerable degree, for instance glycerine and phenol. Others again, for instance all hydrocarbons and their derivatives do not enable the manufacture of uniform products owing to the high vapor pressure and the volatilization caused thereby. They also diminish the binding capacity of added filling materials in the solid state, as they themselves act as filling materials. Additions of resin, celluloid, caoutchouc and the like diminish the indifference against high temperatures which is a special advantage of all resits or final condensation products.

The object of the invention is to remove all these disadvantages. When resol or initial condensation product is heated it is first converted into resitol or intermediate condensation product. This product is no longer soluble, but is still capable of swelling, especially under the action of phenol, which is always formed as normal product of decomposition. As long as the resin to be hardened can be maintained in the intermediate stage, the possibility of a diffusion of this phenol is given. Together with it as carrier, other substances, such as water and formaldehyde may also diffuse.

In order to attain the desired effect viz, the production of a resit or final condensation product entirely free from gas bubbles and internal stresses, the maintenance of the intermediate state at such high temperatures must be ensured, so that the heat has not only sufficient time to penetrate into the interior and to become operative there, but that also the vapor pressure of the volatile products formed becomes so high, that a sufficiently quick diffusion is ensured. It is thus necessary that it should be possible to employ temperatures over 100° C. At this temperature the usual resols or initial condensation products, which have been produced by one-stage processes, are, however, so quickly converted into resits or final condensation products, that they cannot be considered for the purpose in question.

I have now found, that resols or initial condensation products of the necessary kind may be easily produced in the following manner. A mixture of phenol and formaldehyde is first heated in the presence of a little acid until the starting of a reaction can be noticed. The thus obtained product, which is not yet a resin in the proper sense, but merely a non-crystallizing mixture of methylenediphenols $CH_2(C_6H_4.OH)_2$ with unconverted raw products and the like and which on account of its external condition may best be described as a pseudo-resin, is now mixed with a fresh batch of phenol and formaldehyde, the condensation of which must be carried out by a basic condensing agent. The phenolalcohols $C_6H_4(OH)$, $(CH_2.OH)$ produced from the constituents of the second mixture by the action of the base are now resinified together with the methylenediphenols produced in the first stage by correspondingly long boiling. In this manner a resin product is obtained, which is built up of methylenediphenols and phenol alcohols in the proportion in which these two products have been generated in the two stages. The resin thus obtained differs very essentially from resins which have been obtained from a single mixture of phenol and formaldehyde because when this single mixture was condensed by an acid condensing agent, it merely supplied a methylenediphenol resin and when it was condensed by a basic condensing agent it supplied a phenolalcohol resin. This would not be altered by a change in the condensing agents within the same phenol formaldehyde preparation. The new resin can by no means be described as a mere solution of a resin produced by the acid process (finished novolak) in basic resin (finished resol) or initial condensation product. It represents on the contrary a direct combination of methylenediphenols and phenolalcohols, such as has not heretofore been produced in any artificial resin made of phenol and formaldehyde.

There are many variations by which the desired effect may also be obtained. Instead of using any raw methylenediphenol-mixture from an acid condensation between phenol and formaldehyde alone, there may be added already prepared and even crystallized methlenediphenols, such as $CH_2(C_6H_4.OH)_2$, methylene-dicresols, $CH_2(C_6H_3.OH.CH_3)_2$, and the like. It is also possible to condense directly such ready prepared methylene-diphenols with a mixture of a phenol and formaldehyde in the presence of a base. Furthermore, there may also be added phenolalcohols, $C_6H_4(OH).CH_2.OH$, and their derivatives in a crude or pure condition. Finally the methylene-diphenols may be replaced partially or totally by methylene-dinaphthols.

As an example for carrying out the process a mixture of 50 parts of cresol, 25 parts of formaldehyde (40%) are heated with 1 to 1,5 parts of moderately concentrated hydrochloric acid up to the point when stratification just sets in, whereupon immediately a mixture of 100 parts cresol, 75 parts of formaldehyde (40%) and, 20 to 25 parts of aqueous ammonia (25%) are added. The mixture is then boiled for a considerable time, dehydrated in any well known manner and evaporated until a solid, clear transparent resin is obtained, which is completely soluble in alcohol.

Or a mixture of 50 parts of cresol and 25 parts of formaldehyde (40 percent), and some mineral acid is heated with 10 to 20 parts of any methylene-diphenol, such as $CH_2(C_6H_4.OH)_2$ or any methyl-dinaphthol, $CH_2(C_{10}H_7OH)_2$, until the stratification just commences, and then a basic mixture of phenol and formaldehyde is immediately added. Or 50 parts of any pure methylene-diphenol or methylene-dinaphthol are combined directly with the basic mixture of phenol and formaldehyde mentioned above. All these examples merely illustrate the procedure and are capable of wide variation.

The resins produced will withstand heating up to 100° C. and more for a comparatively long time, without passing beyond the intermediate stage, until diffusion from the interior portions takes place. Only then the intermediate condensation product will be gradually converted into resit or final condensation product, which is entirely free from internal stresses and homogeneous throughout. If it be desired to accelerate the formation of the resit or final product, the temperature may be raised without danger after the diffusion has been stopped. Care should only be taken that the raising of the temperature is carried out step by step, for instance in steps of 10 degrees.

It is of particular value, that the specific properties of all the resins obtained by the process described are not affected in any way by the addition of coloring matters or filling substances. It is also a matter of indifference at which stage of the process these additions are made.

The term "phenol" is to be understood to include besides hydroxybenzol ($C_6H_5.OH$) all homologues and also polyphenols, such as resorcin and the like, and the naphthols and their derivatives with a free hydroxyl group. Besides "formaldehyde" itself hexa-methylene tetramine may be used. The polymers of the formaldehyde are suitable as well as their homologues and also acrolein.

"Phenolalcohols" comprise not only the crystallized compounds of that class with the general formula $(C_6H_4(OH)(CH_2.OH)$, but also the crude technical mixtures, which may have been refined, merely by a washing process. Also included in this term is the oily product, which results when a mixture of phenol and formaldehyde with a base is allowed to stand in the cold.

"Dihydroxy-di-phenylmethanes" or "methylene diphenols" with the formula $CH_2(C_6H_4.OH)_2$ must be understood to mean not only the pure compounds of that class, but also the more or less purified crude products and mixtures and in addition those derivatives, in which the phenyl group is replaced by the naphthyl group or the like. Also covered by this term are the derivatives substituted in the methylene group, $$CHR(C_6H_4.OH)_2,$$

and also $$CRR'(C_6H_4.OH)_2$$

and all products which are obtained when phenol-formaldehyde, phenol-acetic aldehyde, phenol-acetone mixtures or their mixtures in the presence of moderately concentrated hydrochloric acid or an analogously acting acid are allowed to stand at a raised temperature or at the temperature of the room. Instead of "acetone" other methyl-ketones and aliphatic ketones, such as diethylketone, may be employed.

Besides hydrochloric acid other acids of mineral or organic character can be used, as well as acid salts or other acid compounds.

Bases of inorganic and organic nature, as well as mixtures of bases of any composition and also basic salts and basic compounds can be used as condensation agents.

What we claim as our invention and desire to secure by Letters Patent is:—

1. A process for producing phenolaldehyde resinous condensation products which comprises condensing together methylene phenols and phenol alcohols which consists in preparing a methylene-diphenol mixture by the action of an acid on phenol and formaldehyde and in resinifying it together with phenol alcohols, produced by the action of a basic condensing agent upon an additional mixture of phenol and formaldehyde, completing the reaction by boiling, dehydrating, and converting the thus obtained soluble initial condensation product into the intermediate product by heating.

2. A process for producing phenolaldehyde resinous condensation products which comprises condensing together methylene phenols and phenol alcohols which consists in preparing a methylene-diphenol mixture by the action of an acid on phenol and formaldehyde, adding phenol alcohols, completing the reaction by boiling, dehydrating, and converting the thus obtained soluble initial condensation product into the intermediate product by heating.

3. A process for producing phenolaldehyde resinous condensation products which comprises condensing together methylene phenols and phenol alcohols which consists in resinifying methylene-diphenols with a mixture of phenol and formaldehyde and a basic condensing agent, completing the reaction by boiling, dehydrating, and converting the thus obtained soluble initial condensation product into the intermediate product by heating.

4. As a new article of manufacture of commerce a final resinous condensation product of phenol alcohols and methylene phenols for electrical purposes, which consists of a homogeneous resin entirely free from gas bubbles and internal stresses.

In testimony whereof we affix our signatures.

CARL KULAS.
CURT PAULING.